United States Patent
Jonckheere et al.

[11] Patent Number: 5,937,746
[45] Date of Patent: Aug. 17, 1999

[54] SAFETY MEANS FOR A NEEDLE TRIP MECHANISM

[75] Inventors: Marc R.M. Jonckheere, Snellegem; Michel P.M Van Colen, Wingene; Marnix J. Schoonheere, Ichtegem, all of Belgium

[73] Assignee: New Holland North America, Inc., New Holland, Pa.

[21] Appl. No.: 09/092,210

[22] Filed: Jun. 5, 1998

[30] Foreign Application Priority Data

Jun. 14, 1997 [GB] United Kingdom ............... 9712336

[51] Int. Cl.⁶ ............... A01F 15/04; B65B 13/26
[52] U.S. Cl. ............... 100/4; 56/343; 100/19 R
[58] Field of Search ............... 100/4, 17–24, 100/179; 56/343

[56] References Cited

U.S. PATENT DOCUMENTS

| | | | |
|---|---|---|---|
| 2,512,896 | 6/1950 | Hill et al. | 100/4 |
| 2,620,724 | 12/1952 | Berry | 100/4 |
| 2,621,588 | 12/1952 | McClellan et al. | 100/19 R |
| 2,746,584 | 5/1956 | Skromme | 100/4 |
| 2,790,336 | 4/1957 | Bornzin | 100/4 |
| 2,807,996 | 10/1957 | Barnes et al. | 100/4 |
| 2,981,173 | 4/1961 | Nolt | 100/4 |
| 3,092,226 | 6/1963 | Williamson | 100/4 |
| 3,129,654 | 4/1964 | Locker et al. | 100/4 |
| 3,195,443 | 7/1965 | Hollyday | 100/4 |
| 3,221,639 | 12/1965 | Rimmey | 100/4 |
| 3,366,036 | 1/1968 | May et al. | 100/4 |
| 3,371,596 | 3/1968 | Nelson | 100/4 |

FOREIGN PATENT DOCUMENTS

| | | |
|---|---|---|
| 594733 | 3/1934 | Germany . |
| 622348 | 11/1935 | Germany . |

*Primary Examiner*—Stephen F. Gerrity
*Attorney, Agent, or Firm*—J. William Stader; Larry W. Miller; Frank A. Seemar

[57] ABSTRACT

An agricultural baler having a main frame, a stuffer for loading successive charges of crop material into a baling chamber installed on the frame and a plunger for compressing the charges into packages of crop material. When the package has reached a predetermined length, a trip mechanism actuates a tying mechanism to tie a series of strands around the package to form a finished bale. The drive line to the tying mechanism comprises a dog clutch assembly including a continuously rotated hub and a dog lever positioned for possible engagement of a cam lobe on the inner surface of the hub. In between tying cycles a lever of the trip mechanism keeps the dog lever away from the hub surface. A timing cam cooperating with a roller on the lever precludes the actuation of the dog clutch when the cam lobe passes in the vicinity of the dog lever. Thus is prevented that a portion of the dog lever engages an edge of the cam lobe, entrains the tying mechanism and then slips off the cam lobe before the tying cycle is completed.

10 Claims, 4 Drawing Sheets

SAFETY MEANS FOR A NEEDLE TRIP MECHANISM

FIELD OF INVENTION

This invention relates generally to agricultural balers with means for tying strands of binding material around packages of crop material, and more particularly, to safety means for precluding a mode of defective operation of these tying means.

BACKGROUND OF INVENTION

Conventional agricultural balers comprise a frame which is travelled on a pair of wheels over a field for picking up therefrom hay, straw or silage grass and feeding this crop material to a baling chamber in which it is compressed to parallelepiped packages under action of a plunger which reciprocates inside the baling chamber. When the packages have reached a predetermined length a tying mechanism is operated to encircle the completed package with a plurality of strands and to knot the strands ends together to form a finished bale which will be ejected out of the baler.

Commonly the tying mechanism is actuated by a trip arm mechanism comprising a sensor wheel which is rotated by the crop material advancing in the baling chamber and a spring loaded trip arm which is raised by the shaft of the sensor wheel until this shaft reaches a notch in this arm. The trip arm is then pulled forwardly and this motion is transmitted upon a lever for engagement of a dog clutch mechanism which accomplishes one full revolution of a drive shaft of the tying mechanism.

The operation of the tying mechanism involves the movement of needles across the baling chamber to provide the lengths of tying strands to the knotter units which tie these lengths to the ends of the same strands to create closed loops around the crop packages and form a finished bale.

As the movement of the plunger is not suspended during the actual tying cycle, careful timing of the tying mechanism is required to preclude collision of an incoming batch of crop material which is pushed rearwardly by the plunger, and the needles. Such collision inevitably engenders serious damage to the needles themselves or to the needle mounting structure.

In most balers, the timing is realized through a fixed transmission between the plunger crank mechanism and the hub of the dog clutch. The orientation of the cam member, which is affixed to the hub for engagement by the dog transmitting the movement from this continuously rotating hub upon the shaft of the tying mechanism, is essential for accomplishing a good timing of the tying cycle.

It has been experienced that, under certain circumstances, after a normal start of the tying cycle, the motion of the needles and knotters may be interrupted while the plunger still continues to reciprocate inside the baling chamber. This may be caused by an incomplete engagement of the dog and the cam member of the clutch. E.g. when the trip mechanism releases the dog at a moment that the cam passes along the dog, the latter may contact the edge of the leading flank of the cam member. The dog then may be kicked inwardly to re-engage the hub somewhat further and, after one revolution of the hub, the dog may contact the full flank of the cam and be entrained by the same to accomplish a proper revolution of the knotter shaft. However, it is also possible that the dog rests for a while on the edge of the cam corner and starts entraining the knotter shaft, thereby initiating the tying cycle and raising the needles, and then unexpectedly slips off the cam. The knotter shaft is halted and the needles remain in their raised position wherein they eventually are engaged by fresh crop material at the next plunger stroke. The plunger forces break the needles or, at least, distort the needle mounting.

Hence it is paramount that upon actuation of the trip mechanism there remains a positive binding between the dog and the cam of the clutch mechanism until the revolution of the clutch is completed. In the dog clutches disclosed in German Patents No. DE 594 733 and No. DE 622 348, incomplete binding of the dog and the cam member is precluded by an extension finger on an arm of the clutch dog. A guide member is attached to the rotating hub adjacent the cam for engagement by the finger in case the clutch mechanism is tripped while the cam is passing in the vicinity of the dog. The dog is released but the finger slides along the guide member and keeps the dog remote from the cam. As the guide member is rotated further, the finger is released and the dog assumes its outer position against the inside of the hub. After a complete revolution the guide member passes over the finger without contacting the same and the dog is permitted to engage the flank of the cam on the inside of the hub.

Such system may be quite successful in assuring a proper binding between the dog and the cam of the dog clutch, but it is not really satisfactory as the critical moment for erratic actuation of the clutch now has shifted to the moment the front edge of the guide member passes along the extension finger of the dog. When the clutch mechanism is tripped at such moment, the edge may engage the top of the finger and start rotating the dog and knotter shaft. Eventually the finger slips off the thin edge of the guide member and the knotter mechanism is halted before the knotting cycle is completed and the needles have returned to their home position, out of the trajectory of the reciprocating plunger. Even if the dog and the knotter shaft do not start cycling and the finger immediately slips off the guide member edge, the premature wear of finger and/or guide member will render this protection system unreliable and ineffective.

SUMMARY OF THE INVENTION

It therefore is an object of the present invention to overcome the problems indicated above and to provide a baler with a trip and clutch mechanism for the knotter apparatus which is both simple and reliable in assuring a sound operation of the needles and the knotters in relation to the movement of the plunger.

According to the present invention, an agricultural baler is provided, comprising a main frame and a baling chamber installed thereon, means for loading charges of crop material into the baling chamber and a plunger for compressing the charges to packages of the crop material therein, a tying mechanism mounted to the baling chamber for tying a strand of binding material around the packages of crop material, drive means for driving the tying mechanism and including a clutch assembly, which comprises a continuously rotated hub provided with a cam lobe on its circumference, and a dog lever including a member movable between a drive interrupting position, in which the member is maintained remote from the trajectory of the cam lobe, and a drive engaging position, in which the member is set to a position in the trajectory of the cam lobe for consequent engagement thereby to actuate the tying mechanism, and trip means cooperating with said clutch assembly and comprising bale length metering means which are operable, until a crop material package of predetermined length has been formed, to maintain the member in the drive interrupting position, and, when a crop material package of predetermined length has been formed, enable setting of the member to its drive engaging position.

The baler is characterized in that it further comprises trip timing means operatively associated with the trip means and the clutch assembly for precluding the setting of the member by the trip means to the drive engaging position when the cam lobe is in a position adjacent the member.

According to a preferred embodiment of the invention the trip means comprise a lever arm for maintaining the dog lever in the drive interrupting position, and the timing means restrict the movement of this lever arm when the cam lobe is in a position adjacent the dog lever member.

The timing means may comprise a timing cam affixed to the clutch hub cooperating with a roller affixed to the lever arm. Advantageously such roller may also be used in cooperation with a reset cam which is rotated during actuation of the tying mechanism for resetting the trip mechanism.

The lever arm may be provided with a key for engagement of an arm of the dog lever, the key having a sharp edge for obtaining a clear and sharp disengagement from the dog lever when the trip mechanism is actuated.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
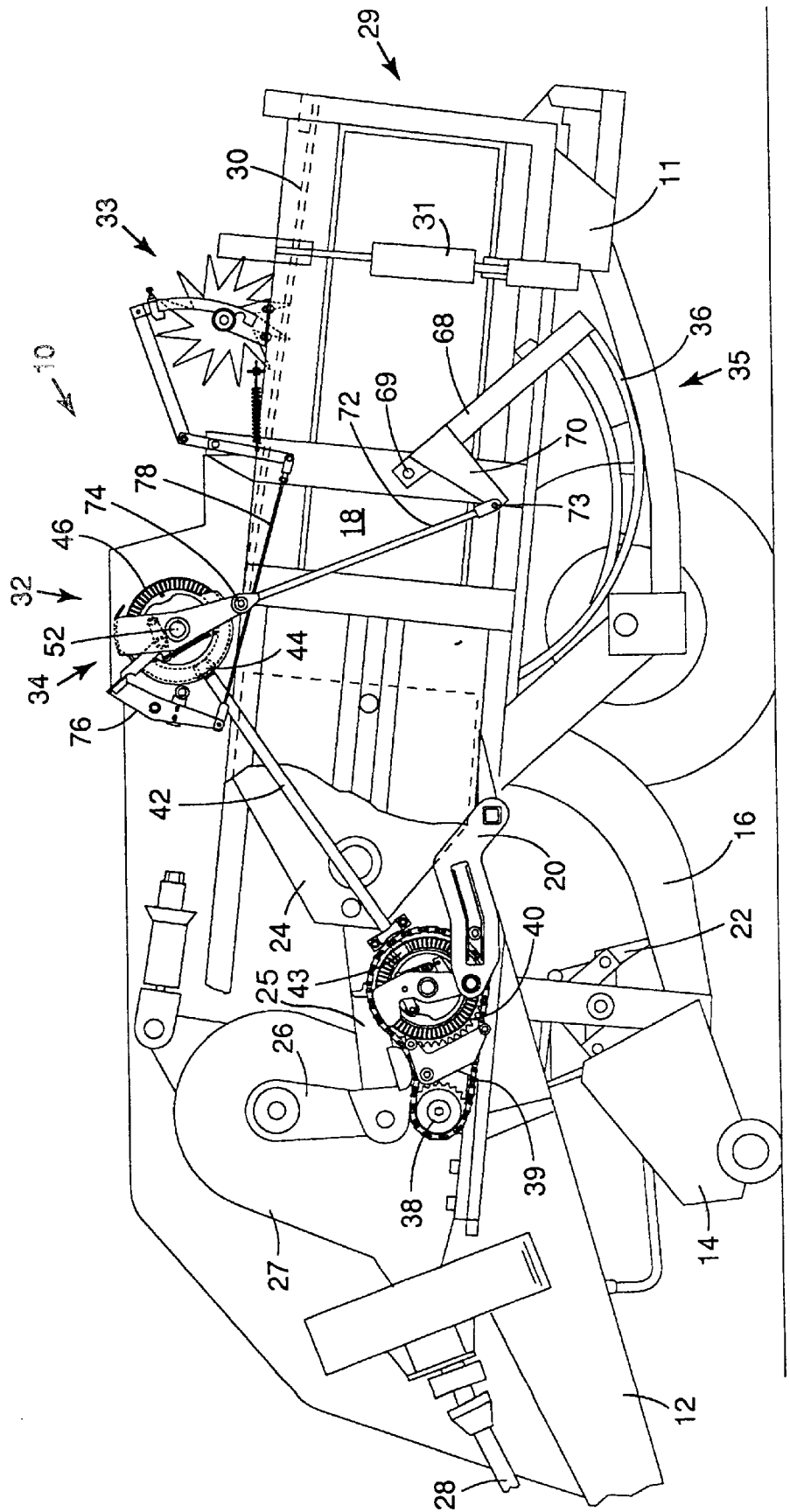
FIG. 1 is a side elevational view of an agricultural baler equipped with a tying mechanism, a trip mechanism and a dog clutch for actuating said tying mechanism.

FIG. 1 shows an agricultural baler 10 comprising a chassis or main frame 11 which is equipped with a forwardly extending tongue 12 provided with hitch means (not shown) at its front end for coupling the baler 10 to a towing tractor. A pick-up assembly 14 lifts windrowed crop material off the field as the baler 10 is travelled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means for establishing whether a complete charge has been formed therein and operating the stuffer 20 in response thereto. Each action of the stuffer 20 introduces a "charge" or "flake" of crop material from the duct 16 into the chamber 18.

A plunger 24 reciprocates in a fore-and-aft direction within the baling chamber 18 under action of a pair of pitman rods 25 which are linked to the crank arms 26 of a gearbox 27 rotated by a shaft 28 which is connected to the PTO shaft of the tractor. The reciprocating plunger 24 pushes each new charge introduced into the baling chamber 18 rearwardly and forms the subsequent charges into a package of crop material, which is pushed by the plunger 24 toward a rearmost discharge aperture 29 of the chamber.

The baling chamber 18 comprises at least one movable wall portion 30 of which the position can be adjusted to vary the cross section of the aperture 29. Reduction of this cross section will increase the resistance to rearward movement of the crop packages and hence the density of the crop material contained therein. Similarly an increase in cross section will reduce the resistance and the density of the newly formed packages. The position of the wall portion 30 is controlled by a pair of actuators in the form of hydraulic cylinders 31 (only one shown in FIG. 1) which are installed between the frame 11 and the wall portion 30.

Each package is securely bound in its final compacted form by a tying mechanism 32 before leaving the confines of the baler 10. The length of each bale produced by the baler 10 can be adjustably predetermined by a trip mechanism 33 discussed in further detail hereafter. When a predetermined length of a package of crop material has been reached the trip mechanism 33 actuates a dog clutch assembly 34 providing driving power to the tying mechanism 32. The latter includes a needle assembly 35 comprising a series of periodically actuated needles 36 which are normally stationed in a stand-by condition below the chamber 18 but which, when actuated, swing upwardly through and across the baling chamber 18 to present twine or other suitable binding material to a corresponding series of knotters (not shown) positioned on top of the chamber 18 and extending across the width of the latter. The number of needles 36 and corresponding knotters depends on the transverse width of the baling chamber. A typical large rectangular baler may include 4 to 6 needle and knotter sets for applying 4 to 6 parallel loops of binding material around the bales.

Driving power to the tying mechanism 32 is supplied by the gearbox 27 via a chain and gear transmission. The chain transmission includes a sprocket wheel 38 driven in timed relationship with the plunger crank arm 26, a chain 39 and a second sprocket wheel 40. In the present embodiment this second wheel also provides driving power to the stuffer mechanism 20. The sprocket wheel 40 is equipped with a crown gear which meshes with a pinion 43 at the lower end of a drive shaft 42. A second pinion 44 is provided at the upper end of the drive shaft 42 for drivingly meshing with a crown wheel 46 of the dog clutch assembly 34. Because of this permanent linkage to the gearbox 27, the crown wheel 46 is rotated continuously in the direction indicated by arrow 110 (FIG. 2) during normal baling operations. The chain and the gear transmission are sized so that the crown wheel 46 performs a complete revolution of 360° during each stroke of the plunger 24 in order to maintain a timed relationship between the position of the plunger 24 and the crown wheel 46.

Figure 2:
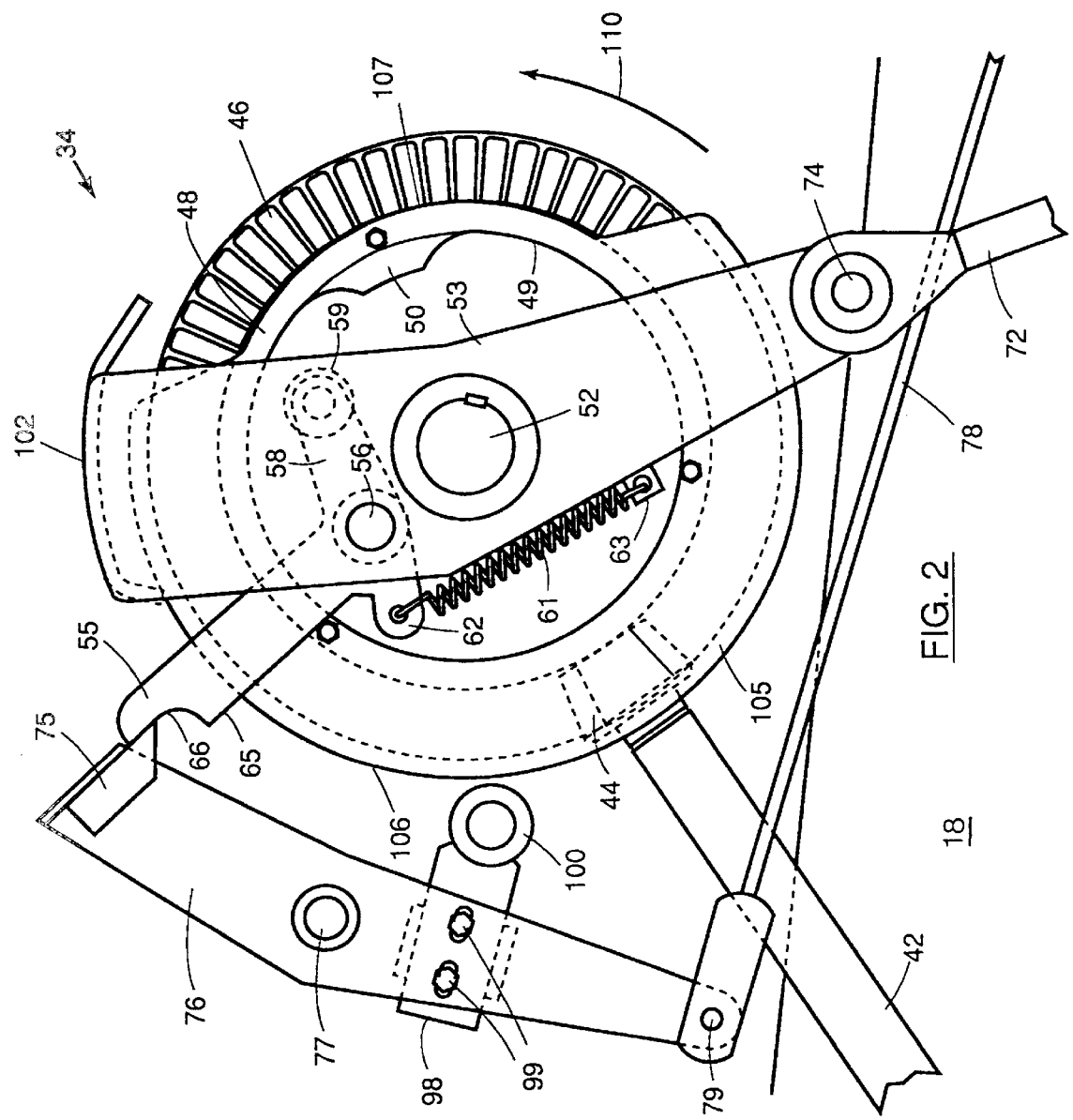
FIG. 2 is an enlarged, fragmentary view of the dog clutch of FIG. 1.

As shown in FIG. 2, the clutch assembly 34 comprises a hub 48 which is affixed to the crown wheel 46. The combined crown wheel 46 and hub 48 are mounted for rotation on, but not permanently affixed to a drive shaft 52 of the knotter mechanism. The hub 48 has on its inner surface 49 a cam lobe 50. A crank 53 is keyed onto the knotter shaft 52 and a clutch dog 55 is journalled at 56 in this crank 53. The dog 55 comprises a member 58 having at its end a roller 59 for possible engagement of the inner hub surface 49. A spring 61 or other convenient resilient means, installed between a lug 63 on the crank 53 and an extension 62 of the dog 55, constantly biases the roller 59 counterclockwise in the direction of this surface 49. The position of the dog 55 is controlled by a dog arm 65, which extends outwardly from the journal 56. At its outer end the dog arm 65 is provided with a notch 66 for receiving therein a key 75 of the trip mechanism 33 described hereinafter.

The needles 36 are affixed to a needle yoke 68 (FIG. 1) which is pivotally mounted to the sides of the baling chamber 18 by a pair of stub shafts 69. A pair of brackets 70 extend forwardly from said yoke 68, the position of which is controlled by links 72 on both sides of the baling chamber 18. At their lower ends, the links 72 are connected by pins 73 to the brackets 70 and, at their upper ends, by pins 74 to the crank 53 on the one side of the baler 10 and another crank (not shown) affixed to the knotter shaft 52 on the other side of the baler.

Figure 3:
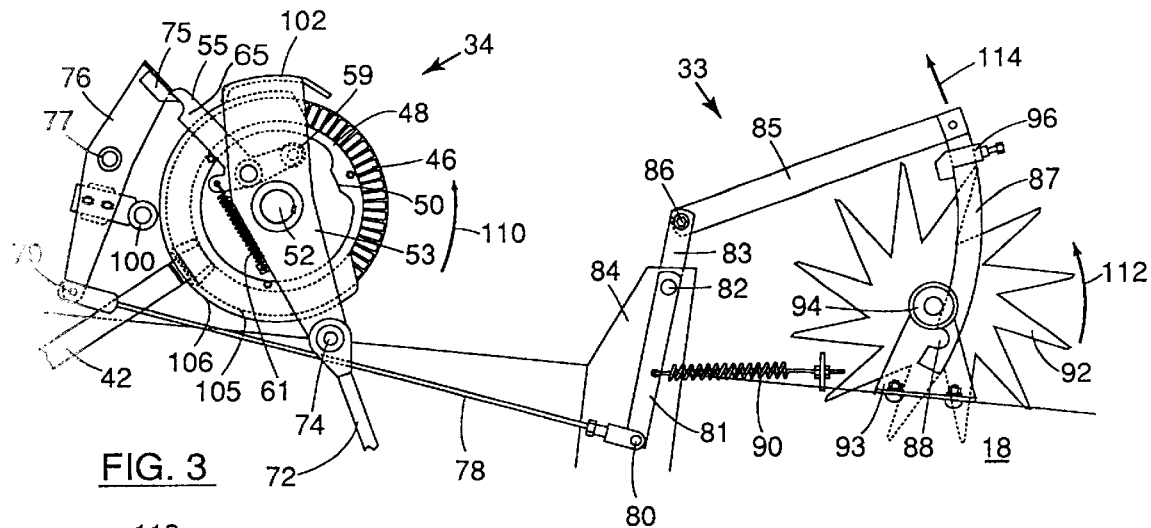
FIGS. 3–7 are somewhat simplified, side elevations views of the trip mechanism and the dog clutch during various, consecutive stages of operation.

The key 75 of the trip mechanism 33 is welded to the upper end of a lever 76, which is mounted for pivotment about a stub shaft 77 affixed to the baling chamber 18. The angular position of the lever 76 is controlled by a rearwardly extending pull rod 78 which is linked at its front end by a pin 79 to the lower portion of the lever 76. As shown in FIG. 3, the rear end of the pull rod 78 is linked by a further pin 80 to the lower end of a first lever arm 81, which is secured to the outer end of a transverse shaft 82 which is supported in a pair of brackets 84 (only one shown) on the baling chamber 18. The inner end of the shaft 82 carries an upwardly extending second lever arm 83 for joint pivotal movement of the arms 81, 83 about the axis of the shaft 82.

A rearwardly extending trip arm 85 is linked by a pivotal connection 86 to the upper end of the second lever arm 83. The trip arm 85 is provided with a curved member 87 having at its lower end a notch 88 for receiving therein the hub of a roller 94. The lever arms 81, 83 are urged in counterclockwise direction by a pull spring 90 which is installed between the first arm 81 and a lug on the baling chamber 18.

The movement of the package of crop material in the baling chamber 18 is sensed by a star wheel 92 whereof the tips engage the top surface of the package. The star wheel 92 is mounted onto the shaft of the roller 94. This shaft is rotatably received in a support 93 on top of the baling chamber 18. The spring 90 urges the inner rim of the curved member 87 against the roller 94, which is rotated by the star wheel 92 in the direction indicated by arrow 112, thereby urging the rear end of the trip arm 85 upwardly as indicated by arrow 114 in FIG. 3. A stop 96 is bolted onto the curved member 87 for definition of the lowest position of the trip arm 85 after the trip mechanism 33 has been reset as explained hereinafter.

FIG. 2 shows a rearwardly extending support 98 which is attached by a pair of bolts 99 to the lower portion of the lever 76. The support 98 carries a reset roller 100, whereof the position with respect to the clutch assembly 34 can be adjusted by loosening the bolts 99 and shifting them in the slots provided in the lever 76. The roller 100 is positioned in the trajectory of a reset cam 102 on top of the crank 53, opposite the pin 74 connecting the crank 53 to the needle link 72. When the clutch assembly 34 is actuated by the trip mechanism 33 and the crank 53 is rotated by the dog member 58 in full engagement with the continuously rotating cam lobe 50, the reset cam 102 passes along the roller 100 and pushes the same forwardly, thereby pivoting the lever 76 in a clockwise direction indicated by arrow 119 in FIG. 6. The link 78 is pulled forwardly and the lever arms 81, 83 are pivoted in a clockwise direction about the axis of the shaft 82. The trip arm 85 is pushed rearwardly to force the notch 88 out of the roller 94. The curved member 87 is no longer sustained by the roller 94 and drops to the position shown in FIG. 7, in which the stop 96 rests on the roller 94.

When the reset cam 102 is rotated further and disengages the roller 100, the action of the spring 90 pulls the link 78 rearwardly and pivots the arm 83 forwardly such that the inner rim of the curved member 87 is held firmly against the roller 94. From now on the rotation of the star wheel 92 will raise the trip arm 85 again.

According to the invention the motion of the lever 76 is limited by a timing cam 105 (FIG. 2) which is affixed by three bolts to the hub 48. The timing cam 105 is spaced from the gears of the crown wheel 46 for avoiding interference with the pinion 44. The dog arm 65 is positioned at the outside of the cam 105. The rim of the timing cam 105 comprises an outer cam portion 106 extending beyond the radius of the crown wheel 46 for engagement of the reset roller 100, and an inner cam portion 107 having a radius which is substantially equal to the outer radius of the hub 48. The outer portion 106 extends over more than 180° of the circumference of the crown wheel 46.

When the lever 76 is held in its drive-interrupting position as shown in FIG. 2, the reset roller 100 is at only a small distance, e.g. 4 mm, from the trajectory of this outer cam portion 106. When the trip mechanism 33 is actuated to pivot the lever 76 counterclockwise, the roller 100 contacts the outer cam portion 106 in case the latter passes along the roller, and precludes further pivotment of the lever 76, such that the key 75 on top of the lever 76 cannot disengage from the dog arm 65. Consequently the dog 55 cannot engage the cam lobe 50 until the complete outer cam portion 105 has passed along the roller 100 and the latter enters into the gap defined by the inner cam portion 107. The orientation of the outer cam portion 106 to the cam lobe 50 is such that the movement of the lever 76 is restricted when the lobe 50 passes in the proximity of the dog roller 59.

The operation of the trip mechanism 33 and the clutch assembly 34 will now be described in further detail with reference to the FIGS. 3 to 7.

While the plunger 24 reciprocates in the baling chamber 18 to urge packages of crop material rearwardly, the star wheel 92 and the roller 94 are rotated counterclockwise by the compressed crop material as indicated by arrow 112 in FIG. 3. The curved member 87 of the trip arm 85 is pulled by the spring 90 and the lever arms 81, 83 against the roller 94, which urges the rear end of the arm 85 upwardly in the direction of arrow 114. As the center of curvature of the member 87 coincides with the pivotal connection 86, the latter will not move during the upward movement of the trip arm 85. Hence the position of the lever arm 81 and the pull rod 78 does not change as long as the notch 88 in the lower end of the curved member 87 has not reached the roller 94. The pull rod 78 holds the lever 76 in a fixed position in which the key 75 is engaged by the arm 65 of the clutch dog 55. The key 75 holds the roller 59 of the dog 55 at a distance from the trajectory of the cam lobe 50, such that the crown wheel 46 transmits no motive power upon the crank 53. Meanwhile, the outer portion 106 of the timing cam 105 passes at a small distance from the reset roller 100.

Figure 4:
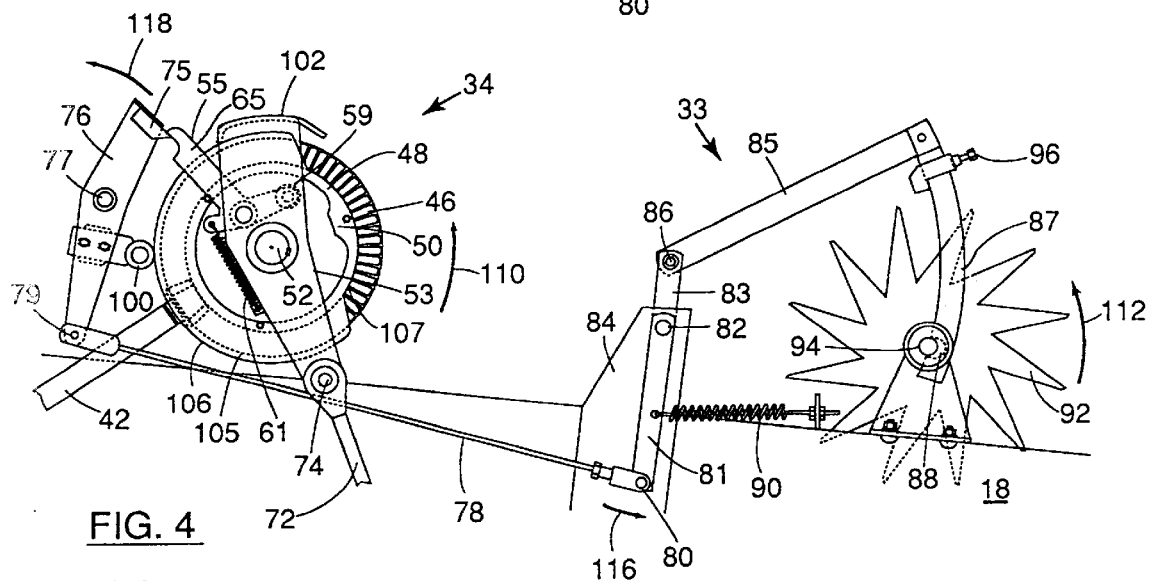

When the package of crop material in the baling chamber 18 has reached a predetermined length, the roller 94 is received into the notch 88 in the curved trip arm member 87 (FIG. 4) and the arm 85 is pulled forwardly by the spring 90. The lever arms 81, 83 pivot in the direction indicated by arrow 116 and exert a rearward force on the pull rod 78. The lever 76 is pivoted in a counterclockwise direction as indicated by arrow 118 to trip the clutch assembly 34. In case the cam lobe 50 is passing in the vicinity of the dog roller 59, as illustrated in FIG. 4, the presence of the outer cam portion 106 adjacent the reset roller 100 will prevent the actual actuation of the clutch assembly 34. The pivotal movement of the lever 76 is halted by the roller 100 which may travel over said small distance of e.g. 4 mm, and then contacts the outer portion 106 of the timing cam 105. The consequent small movement of the key 75 does not suffice to disengage the dog 55, such that the dog roller 59 cannot engage the cam lobe 50.

On the other hand the restricted movement of the lever 76 is transmitted by the pull rod 78 upon the lever arms 81, 83, such that the trip arm is held in a forward position and the star wheel roller 94 does not depart from the notch 88 in the curved member 87. Consequently the trip arm 85 is maintained in its upper, clutch tripping position.

Figure 5:
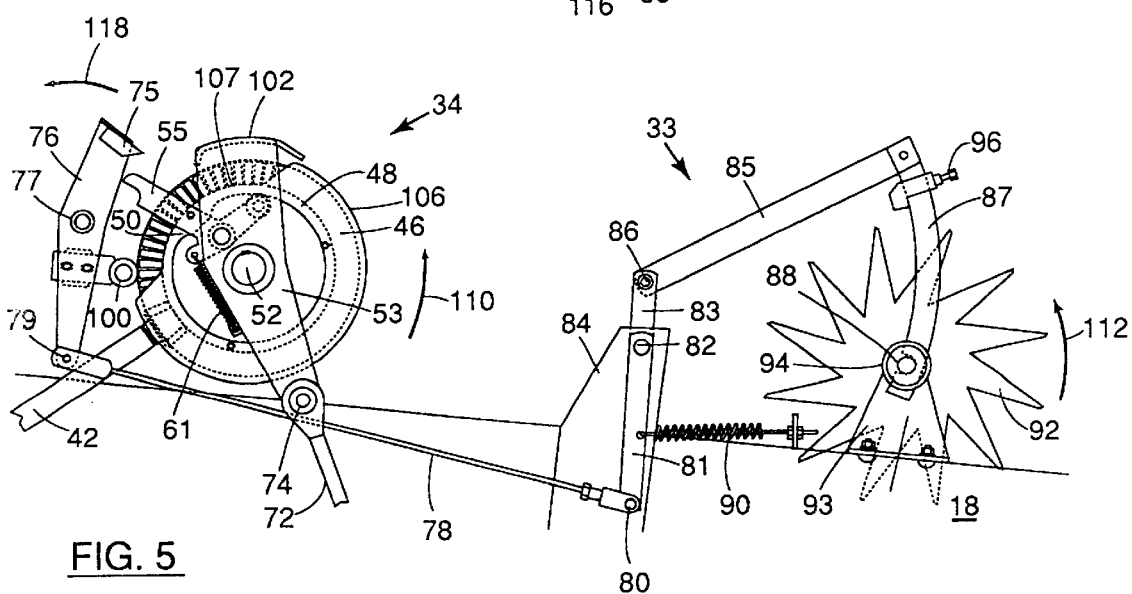

Meanwhile the crown wheel 46 is rotated further by the chain and gear transmission and eventually the reset roller 100 reaches the trailing edge of the outer cam portion 106 (FIG. 5). The spring 90 pulls the roller 100 in the direction of the crown wheel 46 and pivots the lever 76 further in the direction of arrow 118. Simultaneously the lever arms 81, 83 urge the trip arm 85 forwardly until the star wheel roller 94 engages the rear edge of the notch 88. The position of the lever 76 is now defined by the position of the notch 88 on the roller 94. There may remain a small clearance between the reset roller 100 and the outer rim of the crown wheel 46.

The further pivotment of the lever 76 sufficed to remove the key 75 from the notch 66 in the dog arm 65. The key 75 has a sharp edge such that there is a clear and sharp disengagement from the dog 55. The triangular cross section also prevents that the downward movement of the dog 55 is hampered by the facing flank of the key 75 in case the movement of the lever 76 would be retarded or reversed by vibrations or technical failures of the trip mechanism 33.

The spring 61 pivots the clutch dog 55 in counterclockwise direction until the roller 59 engages the inner hub surface 49 and loads this roller thereagainst.

Figure 6:
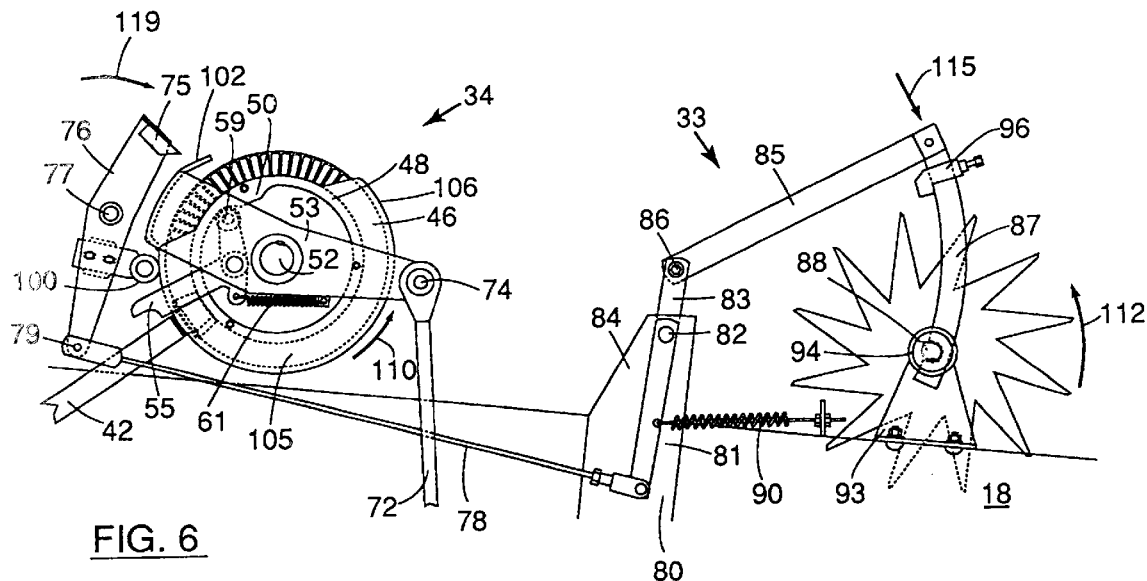
Figure 7:
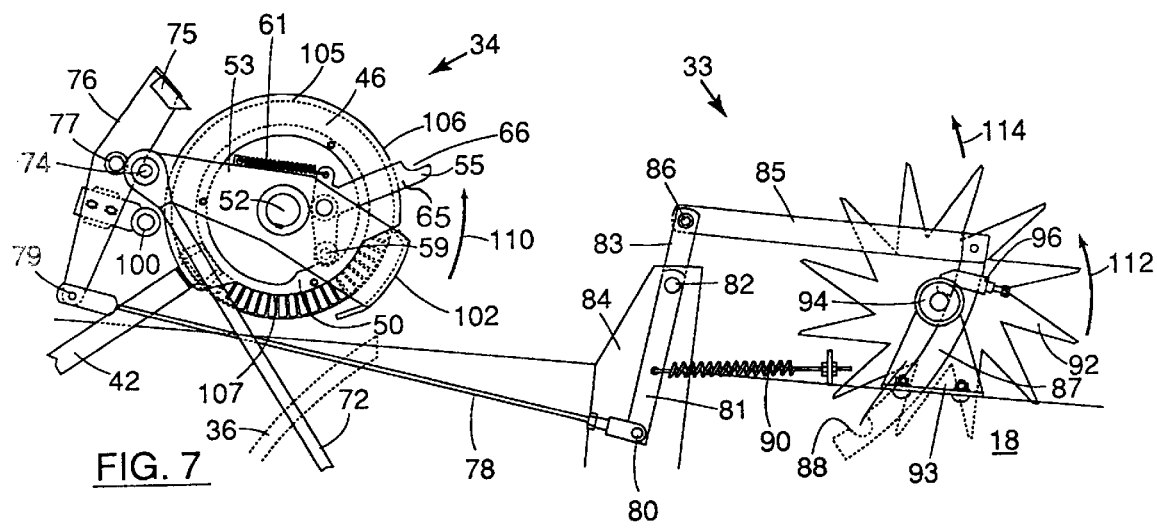

The dog roller 59 is now ready for engagement by the leading flank of the cam lobe 50. At the moment the dog 55 is released, the cam lobe 50 had already travelled past the roller 59 such that there is no risk that the roller 59 contact the leading edge of the lobe 50 and effect a possibly unstable actuation of the clutch assembly 34. As the hub 48 and the timing cam 105 continue to rotate while the spring 61 holds the roller against the surface 49, the leading edge of the outer cam portion 106 will engage the reset roller 100 and push the same forwardly, thereby pivoting the lever 76 in the direction of arrow 119 (FIG. 6). As the dog arm 65 is still pivoted in its lower position below the trajectory of the key 75, this movement of the lever 76 has no effect on the clutch assembly 34. The pivotment of the lever 76 will engender a slight rearward movement of the trip arm 85, but this movement does not suffice to push the notch 88 out of engagement with the star wheel roller 94. Hence the trip arm 85 is still maintained in its upper position.

After about tree quarters of a revolution of the hub 48, starting from the tripping of the clutch dog 55, the leading flank of the lobe 50 engages the roller 59 and drives the dog 55 for subsequent rotation of the crank 53 and the knotter shaft 52 (FIG. 6). The cranks raise the needles 36 to present strands of tying material to the knotters, which are driven by the rotating shaft 52.

Meanwhile the reset cam 102 on top of the crank 53. pushes the reset roller 100 forwardly. The spring 90 is stretched and the lever 119 is pivoted further in the direction of arrow 119. The corresponding pivotment of the lever arm 83 urges the trip arm 85 reardwardly and pushes the curved member 87 away from the star wheel roller 94, which disengages the notch 88, such that the trip arm 85 is no longer sustained and pivots back (arrow 115) about its connection 86 until the stop 96 rests on the roller 94.

After the passage of the reset cam 102 along the reset roller 100 the lever 76 returns to its original position (FIG. 7) and the spring 90 holds the inner rim of the curved member 87 in engagement with the star wheel roller 94. The rotation of the star wheel 92 again will effect the raising of the trip arm 85 (arrow 114). Meanwhile the crank 53 and the knotter shaft 52 are rotated further.

The key 75 is positioned in the trajectory of the notch 66 of the dog arm 65. Upon completion of a full revolution the dog arm 65 is held back by the key 75 and the subsequent pivotment of the dog 55 about its journal 56 pushes the roller 59 out of engagement with the cam lobe 50. The rotation of the sprocket wheel 46 is no longer transmitted upon the crank 53 and further motion of the tying mechanism 32 is prevented by appropriate brake means (not shown). The complete revolution of the knotter shaft 52 has engendered a complete cycling of the knotters and a return of the needles 36 to their home position. The bale inside the baling chamber 18 is now finished and the next charges of crop material introduced by the stuffer mechanism 20 into the baling chamber 18 will push the finished bale rearwardly to the discharge aperture 29. Meanwhile the new charges are formed into a new package around which loops of strand material will be tied to form the next bale when the predetermined length has been reached and the trip mechanism 33 is actuated as described above.

It will be appreciated that the installation of the timing cam 105 provides a simple though reliable means for preventing hazardous conditions in dog clutches involving the unstable engagement of an edge of the cam lobe 50 by the clutch dog 55.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:
1. An agricultural baler comprising
a main frame and a baling chamber installed thereon,
means for loading charges of crop material into said baling chamber and a plunger for compressing said charges into packages of said crop material therein,
a tying mechanism mounted to said baling chamber for tying a strand of binding material around said packages of crop material,
drive means for driving the tying mechanism and including a clutch assembly, which comprises a continuously rotated hub provided with a cam lobe on its circumference, and a dog lever including a member movable between a drive interrupting position, in which said member is maintained remote from the trajectory of said cam lobe, and a drive engaging position, in which said member is set to a position in the trajectory of said cam lobe for consequent engagement thereby to actuate said tying mechanism, and trip means cooperating with said clutch assembly and comprising bale length metering means which are operable, until a crop material package of predetermined length has been formed, to maintain said member in said drive interrupting position, and, when a crop material package of predetermined length has been formed, enable setting of said member to its drive engaging position, said baler being characterized in that it further comprises trip timing means operatively associated with said trip means and said clutch assembly for precluding the setting of said member by said trip means to said drive engaging position when said cam lobe is in a position adjacent said member.

2. A baler according to claim 1, wherein said trip means further comprise a lever arm movable between a first position adjacent said hub for engagement by said dog lever in order to maintain said member in said drive interrupting position, and a second position remote from said hub for disengagement of said dog lever in order to set said member to said drive engaging position, and said trip timing means preclude the positioning of said lever arm to said second position when said cam lobe is in a position adjacent said member.

3. A baler according to claim 2, wherein said trip timing means comprise a timing cam affixed to said hub.

4. A baler according to claim 3, wherein said lever arm is provided with a roller for engagement by said timing cam when a crop material package of predetermined length has been formed and said cam lobe is in a position adjacent said member.

5. A baler according to claim 4, wherein upon operation of said tying mechanism, said roller is engaged by a reset cam operatively linked to said tying mechanism for moving said lever arm from said second position to said first position.

6. A baler according to claim 3, wherein said timing cam extends over more than 180° of the circumference of said hub.

7. A baler according to claim 2, wherein said trip means further comprise means for biassing said lever arm towards said second position when a crop package of predetermined length has been formed and said trip timing means preclude the actual movement of said lever arm to said second position.

8. A baler according to claim 7, wherein said metering means comprise a metering wheel provided with a roller and mounted to said baling chamber for engagement of the packages of crop material therein, and a trip arm held in engagement with said roller and provided with a notch for receiving therein a portion of said roller when a crop material package of predetermined length has been formed, and said trip timing means are dimensioned to hold said roller portion in said notch while precluding the setting of the dog lever member to its drive engaging position.

9. A baler according to claim 2, wherein said lever arm is provided with a key for engagement by said dog lever, said key having a sharp edge adjacent said hub.

10. A baler according to claim 1 wherein said clutch assembly drives a needle positioning mechanism.

* * * * *